United States Patent
Yao

(10) Patent No.: US 11,277,660 B2
(45) Date of Patent: Mar. 15, 2022

(54) SYNCHRONIZING AUDIO OF A SECONDARY-LANGUAGE AUDIO TRACK

(71) Applicant: DISH Network L.L.C., Englewood, CO (US)

(72) Inventor: Kevin Yao, Cheyenne, WY (US)

(73) Assignee: DISH Network L.L.C., Englewood, CO (US)

( * ) Notice: Subject to any disclaimer, the term of this patent is extended or adjusted under 35 U.S.C. 154(b) by 0 days.

(21) Appl. No.: 16/923,369

(22) Filed: Jul. 8, 2020

(65) Prior Publication Data

US 2020/0344516 A1    Oct. 29, 2020

Related U.S. Application Data

(63) Continuation of application No. 15/997,425, filed on Jun. 4, 2018, now Pat. No. 10,764,631.

(51) Int. Cl.
| | |
|---|---|
| *H04N 21/439* | (2011.01) |
| *G06F 3/16* | (2006.01) |
| *H04N 21/472* | (2011.01) |
| *H04N 21/414* | (2011.01) |
| *H04N 21/4722* | (2011.01) |

(52) U.S. Cl.
CPC ............ *H04N 21/439* (2013.01); *G06F 3/16* (2013.01); *H04N 21/41407* (2013.01); *H04N 21/4722* (2013.01); *H04N 21/47217* (2013.01)

(58) Field of Classification Search
CPC .......... H04N 21/439; H04N 21/47217; H04N 21/41407; H04N 21/4722; H04N 21/43079; H04N 21/43076; H04N 21/42221; H04N 21/8547; H04N 21/4126; H04N 21/8106; H04N 21/4307; G06F 3/16; G06F 3/165
See application file for complete search history.

(56) References Cited

U.S. PATENT DOCUMENTS

| | | | |
|---|---|---|---|
| 9,756,376 B2 | 9/2017 | Hawkins et al. | |
| 2007/0124775 A1 | 5/2007 | DaCosta | |
| 2007/0124777 A1* | 5/2007 | Bennett | H04N 21/4363 725/78 |
| 2011/0164175 A1* | 7/2011 | Chung | H04N 21/4126 348/468 |
| 2013/0272672 A1* | 10/2013 | Padro Rondon | G03B 31/04 386/201 |

(Continued)

OTHER PUBLICATIONS

ISO/IEC 13818-2, Information technology—Generic coding of moving pictures and associated audio, Recommendation H.262, Draft International Standard, Mar. 25, 1994; International Organisation for Standardisation.

*Primary Examiner* — Michael R Telan
(74) *Attorney, Agent, or Firm* — Kilpatrick Townsend & Stockton LLP

(57) ABSTRACT

A method of providing a synchronized secondary audio track via a mobile device. The method includes: receiving, at a mobile device, a request from a user to receive a secondary audio track that corresponds with a primary audio track of an audio-visual (AV) program which is presented to the user; receiving the secondary audio track at the mobile device; receiving at the mobile device a playback-control cue; and in response to receiving the playback-control cue, outputting audio data of the secondary audio track so that the audio data is synchronized with the primary audio track.

20 Claims, 4 Drawing Sheets

(56) References Cited

U.S. PATENT DOCUMENTS

2013/0345841 A1* 12/2013 Garcia ............... H04N 21/8455
                                                        700/94
2016/0323612 A1    11/2016 Stewart
2018/0063572 A1     3/2018 Smus

* cited by examiner

300

SYNCHRONIZING AUDIO OF A SECONDARY-LANGUAGE AUDIO TRACK

CROSS-REFERENCE TO RELATED APPLICATION

This application is a continuation of U.S. patent application Ser. No. 15/997,425, filed Jun. 4, 2018, entitled SYNCHRONIZING AUDIO OF A SECONDARY AUDIO TRACK, which is incorporated herein by reference in its entirety for all purposes.

BACKGROUND OF THE INVENTION

In the United States, television programming may be received by viewers in the English language. Non-English-speaking viewers may find it difficult to enjoy their viewing experience when they do not comprehend the language. Further, subtitles may cause viewer fatigue—e.g., the viewer being required to read to understand the programming, rather than simply view.

DETAILED DESCRIPTION OF THE INVENTION

Figure 1:
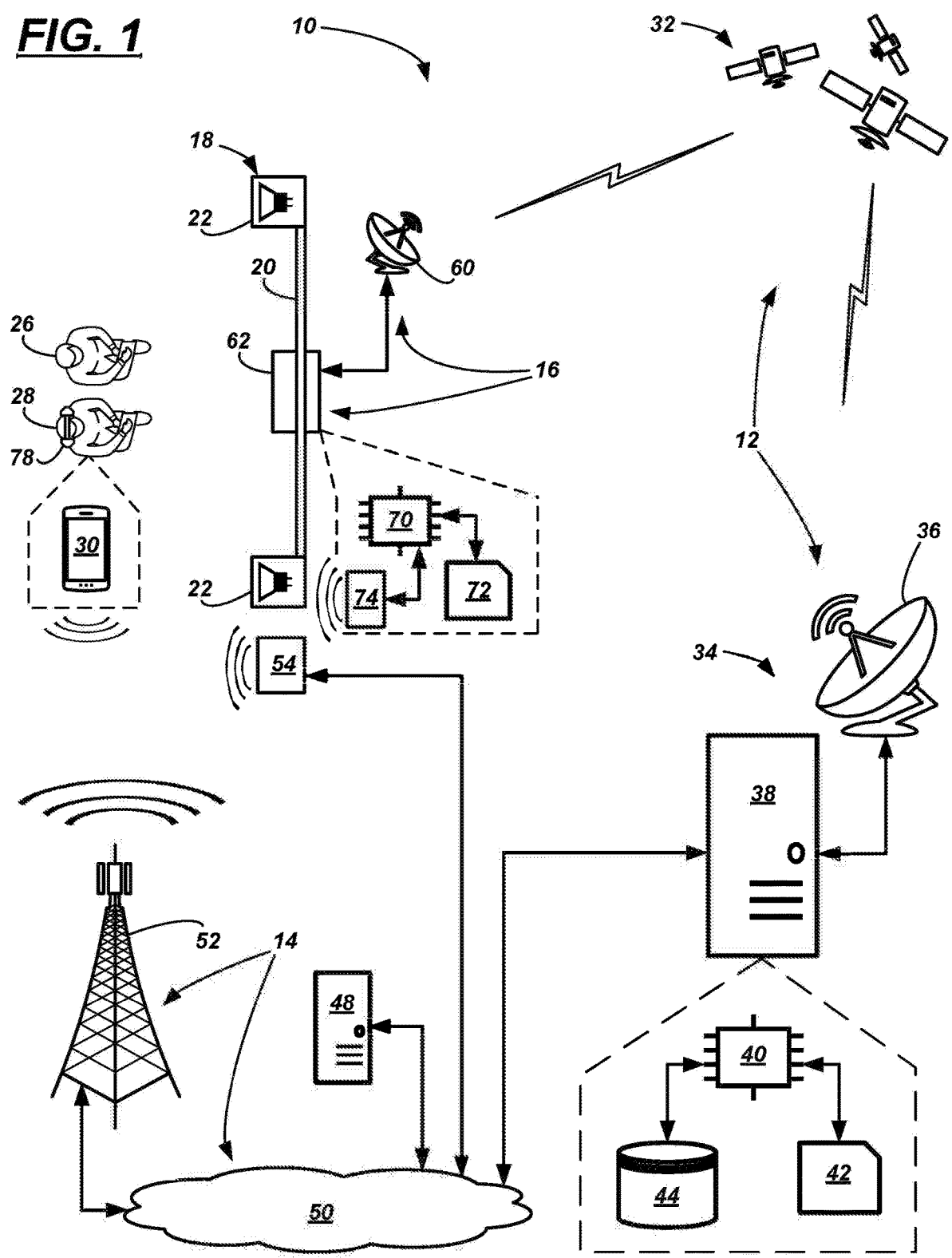
FIG. 1 is a schematic diagram of an illustrative media delivery system.

A number of methods of using a media delivery system to provide a secondary audio track to a user are described herein. Examples discussed herein refer to a secondary-language audio track data, but the secondary audio track could be audio other than a secondary audio track, e.g., commentary, supplemental audio such as music or sound effects, etc. According to at least one non-limiting example, a method comprises: receiving, at a mobile device, a request from a user to receive a secondary-language audio track that corresponds with a primary-language audio track of an audio-visual (AV) program which is presented to the user; receiving the secondary language audio track at the mobile device; receiving at the mobile device a playback-control cue that comprises one of: a fast-forward cue, a rewind cue, a slow-motion cue, a single-frame advance cue, a single-frame rewind cue, a resume-play cue, or a skip cue; and in response to receiving the playback-control cue, outputting audio data of the secondary-language audio track so that the audio data is synchronized with the primary-language audio track.

According to at least one example of the method, the playback-control cue corresponds with timestamps of included in data for an electronic program guide (EPG) or the like stored in memory of the STB.

According to at least one example of the method, the AV program comprises live television, video on-demand (VOD), or near video on-demand (NVOD).

According to at least one example of the method, the playback-control cue is received at the mobile device in response to the STB receiving a playback-control instruction from the user.

According to at least one example of the method, the playback-control cue comprises soundwave data.

According to at least one example of the method, the soundwave data comprises a unique identifier, wherein the method further comprises: receiving the identifier via a microphone of the mobile device; then, using a look-up table stored in memory of the mobile device, determining a unique playback-control instruction; and executing the instruction.

According to at least one example of the method, within a predetermined interval, the mobile device receives a second playback-control cue comprising soundwave data that is redundant of the previously-received playback-control cue.

According to at least one example of the method, the soundwave data has a frequency greater than 18,000 Hertz.

According to at least one example of the method, the soundwave data comprises at least one of white noise, a tone, or a pulse.

According to at least one example of the method, the white noise, the tone, or the pulse is embedded within the primary-language audio track.

According to at least one example of the method, the white noise, the tone, or the pulse is received from an electroacoustic transducer of the STB.

According to at least one other example, a computer program product is described that includes a non-transitory computer-readable medium storing instructions executable by a mobile device, the instructions comprising, to: receive, at a mobile device, a request from a user to receive a secondary-language audio track that corresponds a primary-language audio track of an audiovisual (AV) program which is presented to the user; receive the secondary-language audio track at the mobile device; receive at the mobile device soundwave data that comprises a unique identifier; and in response to receiving the identifier, output audio data comprising the secondary-language audio track so that the audio data is synchronized with the primary-language audio track.

According to at least one additional example, a method is described that comprises: receiving, at a mobile device, a request from a user to receive a secondary-language audio track that corresponds a primary-language audio track of an audio-visual (AV) program which is presented to the user; receiving the secondary-language audio track at the mobile device; receiving at the mobile device soundwave data that comprises a unique identifier; and in response to receiving the identifier, outputting audio data comprising the secondary-language audio track so that the audio data is synchronized with the primary-language audio track.

According to at least one example of the method, the identifier corresponds with timestamps included in data for an electronic program guide (EPG) or the like stored in memory of the STB.

According to at least one example of the method, the soundwave data has a frequency greater than 18,000 Hertz.

According to at least one example of the method, the soundwave data comprises at least one of white noise, a tone, or a pulse.

According to at least one example of the method, the white noise, the tone, or the pulse is embedded within the primary-language audio track.

According to at least one example of the method, the white noise, the tone, or the pulse is received from an electroacoustic transducer of the STB.

According to at least one example of the method, the identifier indicates to the mobile device one of: a fast-forward cue, a rewind cue, a slow-motion cue, a single-frame advance cue, a single-frame rewind cue, a resume-play cue, or a skip cue.

According to the at least one example, a computer is disclosed that is programmed to execute any combination of the examples of the method(s) set forth above.

According to the at least one example, a computer program product is disclosed that includes a computer readable medium that stores instructions executable by a computer processor, wherein the instructions include any combination of the examples of the method(s) set forth above.

Turning now to FIG. 1, a media delivery system 10 is shown that includes a satellite communication system 12, a wired and/or wireless communication system 14, and a plurality of terminal systems 16. By way of example, only one terminal system 16 is illustrated; however, typically, many terminal systems 16 receive audio-visual programming data from satellite communication system 12.

As will be described in detail below, the satellite communication system 12 may provide audio-visual (AV) programming to the terminal systems 16 for user use and/or enjoyment. The terminal system 16 may be connected communicatively to an entertainment system 18 (e.g., a television 20 (also referred to as a display, monitor, etc.) and/or loudspeaker(s) 22 (e.g., which may be integral to or peripheral to television 20 (e.g., peripheral implementations including soundbar implementations, surround-sound implementations, and the like). Accordingly, an AV program may be received at the terminal system 16 from the satellite communication system 12 and may be presented to users 26, 28. Typically, the television 20 provides at least a visual component of the AV program, while loudspeakers 22 provide an audio component thereof. Using the loudspeakers 22, the audio component may be presented to the users 26, 28 in a primary audio track e.g., in a single (e.g., first) language using primary audio track that comprises a primary language audio track (e.g., which may be transmitted with the visual component from the satellite communication system 12).

In some instances, however, at least one of the users (e.g., user 28) may desire to hear an audio component in a second (and different) language (e.g., while the other user (e.g., user 26)) listens to an audio component in the first language. In order to accommodate user 28, and as described below, the system 10 further may comprise a mobile device 30 which delivers to user 28 a secondary audio track such as a secondary-language audio track. As described below, the mobile device 30 may receive playback-control cues from the terminal system 16 (or from the primary audio track), and in response to such cues, mobile device 30 may synchronize the secondary audio track, e.g., a secondary-language audio track, with the AV program. Further, when user 26 or 28 fast-forwards playback, rewinds playback, etc. of the AV program, mobile device 30 may receive additional playback-control cues and continue to synchronize the secondary-language audio track with the AV program. A synchronization process will be explained in greater detail below, following a description of an exemplary operating environment.

As set forth above and shown in FIG. 1, media delivery system 10 may comprise any suitable electronics which facilitate delivery of AV programs over a wide geographic region. According to at least one example, system 10 comprises the illustrated satellite communication system 12, the wired and/or wireless communication system 14, and the plurality of terminal systems 16. As used herein, an audio-visual (AV) program means any electronically communicated analog or digital data that comprises both a visual component and at least one audio component, wherein the at least one audio component is synchronized with (or upon arrival at the terminal system 16, is configured to be synchronized with) the visual component. Accordingly, when the visual component comprises video of a person speaking, the words (delivered via the audio component) can be synchronized with the lips of the speaking person. To be synchronized, with respect to video of person(s) speaking, as used herein, means that the audio and visual components are matched to one another to minimize lip sync skew, wherein the skew between the audio and visual components is less than 50 milliseconds (ms). Of course, in some examples, the at least one audio component may be an overdub or the like-i.e., audio comprising human speech without a visual component of a corresponding person's lips moving; in these examples, synchronization of the audio component may be within any suitable tolerance (e.g., 50 ms, 100 ms, etc.). Non-limiting examples of AV programs include live AV programming (e.g., television or cable news, sporting events, etc.) and pre-recorded AV programming (e.g., previously-recorded news, previously-recorded sports, movies, series episodes, educational shows, documentaries, etc.).

Satellite communication system 12 may comprise a constellation of satellites 32, and a satellite gateway 34 that includes a transceiver 36 and a computer server 38—the server 38 storing and managing delivery of AV programming to the plurality of terminal systems 16 using the satellites 32 and transceiver 36. Satellites 32 may comprise any suitable quantity of orbiting devices. In at least one example, each satellite 32 thereof may be identical; therefore, only one will be described. Satellite 32 may be any suitable satellite communication equipment located in earth's orbit-non-limiting examples include: communications satellites, observation satellites, navigation satellites, weather satellites, space telescopes, etc. Non-limiting examples of earth orbits include: geocentric orbits, heliocentric orbits, areocentric orbits, low earth orbits (LEO), medium earth orbits (MEO), geosynchronous orbits (GEO), high earth orbits (HEO), etc. Other orbits or orbit classifications also exist and are known to skilled artisans.

According to one example, satellite 32 may be a so-called bent-pipe satellite. For example, satellite 32 may receive a wireless uplink communication from gateway 34, amplify the communication, perform a frequency shift (to convert the uplink communication to a downlink communication), amplify the downlink communication, and transmit the downlink communication to one or more terminal systems 16. This is merely one example; systems other than bent-pipe systems can be used instead. Further, satellite technology is generally known; accordingly, other aspects of satellites 32 will not be described herein.

The transceiver 36 and computer server 38 of gateway 34 also are generally known in the art and will not be described in detail below. For example, transceiver 36 may comprise any suitable satellite antenna device capable of providing broadband services. In one example, transceiver 36 both sends and receives wireless satellite communications; however, in other examples, transceiver 36 simply may be a transmitter (e.g., and not a receiver). Still other examples exist.

Computer server 38 may comprise one or more processors 40, computer memory 42, and one or more databases 44. According to one example, processor(s) 40 may comprise one or more devices capable of processing electronic instructions-non-limiting examples including: a microprocessor, a microcontroller or controller, an application specific integrated circuit (ASIC), a field-programmable logic array (FPGA), etc.-just to name a few. Processor 40 may be dedicated to server 38, or it may be shared with other server systems and/or computer subsystems. As will be apparent from the description which follows, server 38 may be programmed to carry out at least a portion of the method described herein. For example, processor(s) 40 can be configured to execute digitally-stored instructions which may be stored in memory 42 which include sending AV programs comprising at least one primary-language audio track to terminal systems 16 via satellite communication system 12.

As used herein, a primary audio track, such as the exemplary primary-language audio track discussed herein, is an audio component of an AV program comprising human speech (substantially in one language in the case of a primary-language audio track), wherein the human speech is or can be synchronized to a corresponding visual component of the AV program, wherein the primary-language audio track is provided from the satellite gateway 34 via satellite(s) 32 to at least one terminal system 16. In some examples, the visual component and the primary-language audio track (that comprises at least a portion of the audio component) are received by the terminal system 16 as synchronized to one another. In other examples, prior to presentation to user(s) 26, 28 via entertainment system 18, the terminal system 16 synchronizes the visual and audio components. Substantially in one language means at least 90% in a common language (i.e., S 10% foreign language(s)).

In some examples, the audio component of the AV program may comprise a plurality of selectable primary-language audio tracks (e.g., each track being in substantially a different language). Thus, using entertainment system 18 and/or the terminal system 16, users 26, 28 may select from a plurality of primary-language audio track choices for playback via entertainment system 18, and only the selected primary-language audio track may be presented thereby to users 26, 28.

Memory 42 may include any non-transitory computer usable or readable medium, which may include one or more storage devices or articles. Exemplary non-transitory computer usable storage devices include conventional computer system RAM (random access memory), ROM (read only memory), EPROM (erasable, programmable ROM), EEPROM (electrically erasable, programmable ROM), as well as any other volatile or non-volatile media. Non-volatile media include, for example, optical or magnetic disks and other persistent memory. Volatile media include dynamic random-access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read. As discussed above, memory 42 may store one or more computer program products which may be embodied as software, firmware, or the like.

In at least one example, server 38 includes one or more databases 44 to store, among other things, collections of pre-recorded AV programs in a filing system. Non-limiting examples of AV programs include movies, television series (e.g., organized by episode, season, series, etc.), documentaries, television specials, previously-recorded sporting events, advertisements, etc. Accordingly, computer server 38 may use processor(s) 40 to: retrieve from databases 44 multiple AV programs; and control operation of the transceiver 36 in order to provide the visual and audio components of the AV programs to the terminal systems 16 via the satellite communication system 12. Accordingly, databases 44 may be used to store files of so-called video on-demand (VOD) or near video on-demand (NVOD), wherein, when requested by users 26, 28, the server 38 provides the demanded AV program via communication system 12.

Using computer server 38, live (or not-previously-recorded) AV programs also may be transmitted to the terminal systems 16 using the transceiver 36 and satellite communication system 12. For example, one or more public television and/or cable network computers 48 may broadcast live television (e.g., live AV programs) using satellite communication system 12. According to at least one example, computer(s) 48 first send live AV programming data to computer server 38 via wired and/or wireless communication system 14; then satellite gateway 34 may transmit the live AV program(s) to the terminal systems 16 (as described above). Additional aspects of live TV via satellite transmission, as well as other live AV programming techniques, will be appreciated by skilled artisans.

It should be appreciated that computer(s) 48 may or may not be affiliated with or owned by the same entity which owns and/or operates computer server 38 (or gateway 34). Regardless of affiliation, computer server 38 may provide live and/or pre-recorded AV programs to terminal systems 16, according to at least the non-limiting examples set forth above. Further, while one computer 48 is shown; in at least one implementation, multiple computers 48 are in communication with gateway 34.

Turning now to wired and/or wireless communication system 14 shown in FIG. 1, system 14 may comprise a land communication network 50 and a wireless communication network 52. Network 50 may include any wired network enabling connectivity to public switched telephone network (PSTN) such as that used to provide hardwired telephony, packet-switched data communications, internet infrastructure, and the like. Network 50 may be coupled to computer(s) 48 (as described above), to computer server 38 (as described above), to wireless communication network 52, and to a plurality of wired and/or wireless modems 54 (again, only one is shown for purposes of illustrating an example; these modems 54 may be, e.g., residentially-used and/or commercially-used modem and/or routers, or the like).

Wireless communication network 52 may include any suitable infrastructure facilitating cellular communication, including but not limited to, infrastructure configured for LTE, GSM, CDMA, etc. communication. For example, network 52 may comprise a plurality of e-NodeBs, serving and gateway nodes, location registers, etc.—e.g., according to known wireless network infrastructure and telecommunication techniques. Other aspects of land and/or wireless communication networks 50, 52 also will be appreciated by skilled artisans.

As will be described below, mobile device 30 may receive a secondary-language audio track via network 50 and/or network 52; this secondary-language audio track may provide an alternative language to the primary-language audio track which is presented with the AV program via the entertainment system 18. For example, while the primary-language audio track may comprise human speech in a first language, the secondary-language audio track comprises human speech that corresponds with the visual component of the AV program, but in a second, different language. Thus, as used herein, a secondary-language audio track is an audio component, received via the mobile device 30, that supports and corresponds with the visual component of an AV program received by the terminal system 16 which is presented to user 28 by the entertainment system 18. And as discussed below, mobile device 30 may synchronize playback of the secondary language audio track with the visual component of the AV program (and/or synchronize playback with the primary-language audio track of the AV program).

As will be explained more below, according to one example, mobile device 30 may download or stream a secondary-language audio track via a cellular connection with network 52—e.g., download the track from database 44 (of computer server 38) through land communication network 50, and through wireless communication network 52. According to another example, mobile device 30 may download or stream the secondary-language audio track via a short-range wireless connection with modem 54—e.g., download the track from network 50 by receiving data from database 44 (of computer server 38) through land communication network 50 and through modem 54 (which modem may be located within short-range wireless communication range of entertainment system 18 and mobile device 30). These are merely examples; other downloading techniques are also possible.

Turning now to terminal systems 16, an exemplary terminal system 16 may be located at a residential location, a commercial location, or the like and may comprise a satellite receiver antenna 60 and a set top box (STB) 62. Antenna 60 may be any suitable antenna configured to receive satellite downlink communications from satellite(s) 32—e.g., which downlink communications include one or more AV programs (e.g., typically a plurality of AV programs being received concurrently).

STB 62 may be computer hardware that comprises at least one processor 70 and memory 72. Some aspects of processor 70 and memory 72 may be similar to aspects of processor 40 and memory 42, as set forth above—e.g., except that instructions stored in memory 72 and executable by processor 70 may differ, as the functions and operations of the STB 62 may differ from those of the server 38.

For example, processor 70 also may comprise one or more devices capable of processing electronic instructions, non-limiting examples including a microprocessor, a microcontroller or controller, an application specific integrated circuit (ASIC), a field-programmable logic array (FPGA), etc.—just to name a few. As will be apparent from the description which follows, STB 62 may be programmed to carry out at least a portion of the method described herein. For example, processor 70 can be configured to execute digitally-stored instructions which may be stored in memory 72 which include, according to one example: transmitting playback-control cues to mobile device 30 so that device 30 may use the cues to synchronize the downloaded secondary-language audio track with the visual component of the AV program being presented by the entertainment system 18.

Like memory 42, memory 72 may include any non-transitory computer usable or readable medium, which may include one or more storage devices or articles. Exemplary non-transitory computer usable storage devices include conventional computer system RAM (random access memory), ROM (read only memory), EPROM (erasable, programmable ROM), EEPROM (electrically erasable, programmable ROM), as well as any other volatile or non-volatile media. Non-volatile media include, for example, optical or magnetic disks and other persistent memory. Volatile media include dynamic random-access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read. As discussed above, memory 72 may store one or more computer program products which may be embodied as software, firmware, or the like.

According to one example, memory 72 updates and stores a program data, e.g., as provided for an electronic program guide (EPG) or the like—e.g., received from gateway 34 (e.g., via satellite(s) 32 and/or even network 50). The program data may comprise information relating to the scheduling of AV programs which can be presented to the users 26, 28 via the entertainment system 18. Such information may include AV program start times, durations, commercial interlude times and durations, end times, and the like. According to one example, processor 70 looks up program data, and based on the program data, processor 70 facilitates a wireless transmission, to mobile device 30, and provides playback-control cues that correspond with timestamps of an AV program start time, an AV program duration, a beginning of a commercial interlude during an AV program, an end of a commercial interlude, an AV program end time, etc.—e.g., so that mobile device 30 may synchronize a secondary-language audio track with a respective, scheduled AV program. According to a few non-limiting examples, wireless transmissions facilitated by processor 70 may utilize Wi-Fi, Bluetooth, acoustic signals, light signals, or the like.

According to one example, STB 62 may comprise an electroacoustic transducer 74. And transducer 74 may comprise loudspeaker or other acoustic elements so that emit playback-control cues in the form of soundwave data. In at least one example, the soundwave data comprises a unique identifier that enables mobile device 30 to synchronize playback of the secondary language audio track with the visual component of the AV program, as will be explained more below. Non-limiting examples of soundwave data include white noise, tones, or pulses—e.g., which may or may not be audible by users 26, 28.

Figure 2:
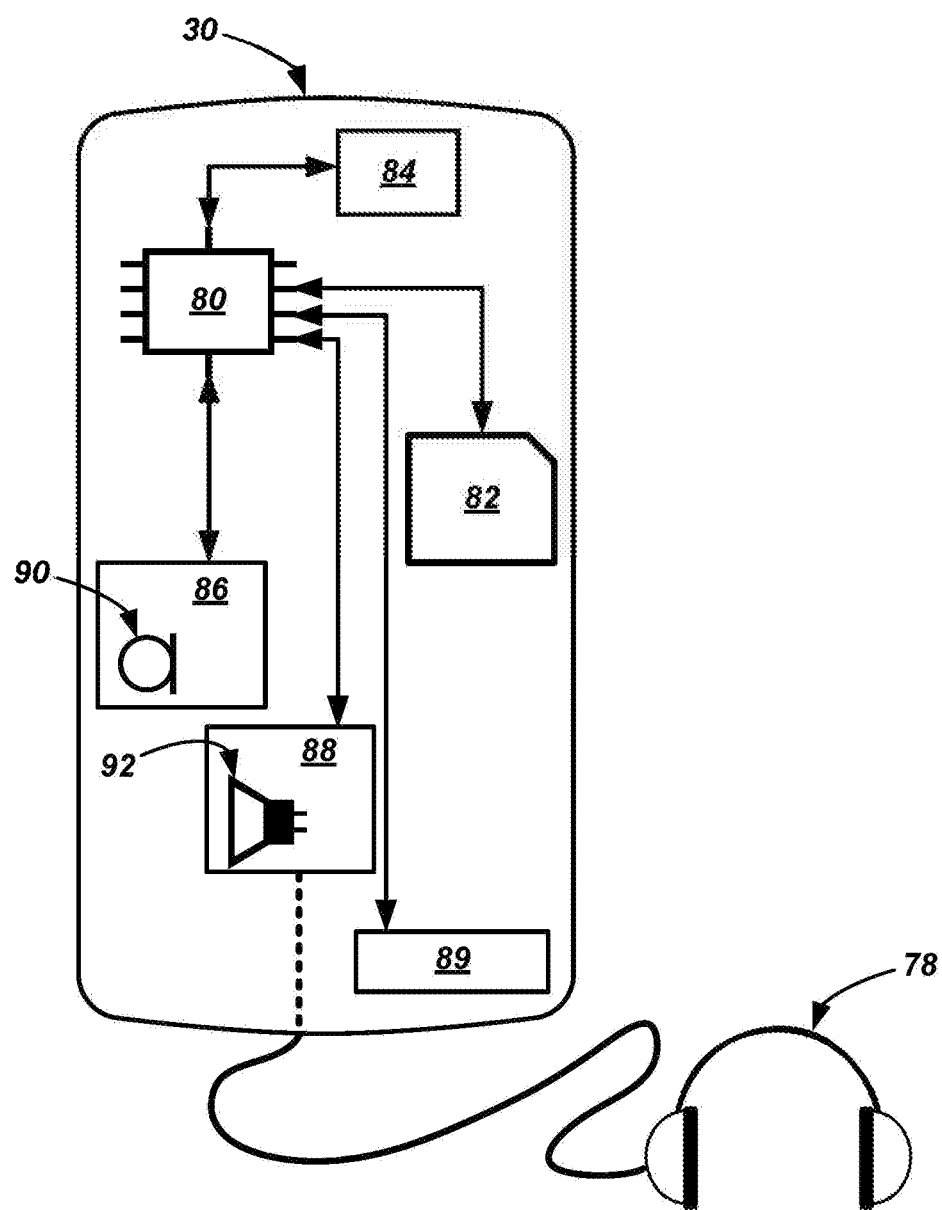
FIG. 2 illustrates one example of a mobile device used to synchronize audio of a secondary-language audio track for a user.

FIGS. 1-2 illustrate an example of mobile device 30 and a pair of exemplary earphones 78. In general, mobile device 30 may include hardware, software, and/or firmware enabling cellular telecommunications, short-range wireless communication (e.g., Wi-Fi, Bluetooth, and/or the like), and/or communication by wire or tether, as well as executing any suitable mobile device applications. Such mobile device applications may include software applications, which may be installed by the user (or manufacturer) (e.g., using a graphical user interface or GUI). Non-limiting examples of the mobile device 30 include a cellular telephone, a personal digital assistant (PDA), a Smart phone, a personal laptop computer having two-way communication capabilities, a netbook computer, a tablet computer, or combinations thereof. In at least one example, mobile device 30 is a Smart phone.

According to one example, mobile device 30 may comprise a processor 80, memory 82, one or more wireless chipsets 84, an audio-input circuit 86, an audio-output circuit 88, and an interactive mobile device interface 89. Some aspects of processor 80 and memory 82 may be similar to aspects of processor 40 and memory 42, as set forth above—e.g., except that instructions stored in memory 82 and executable by processor 80 may differ, as the functions and operations of the mobile device 30 may differ from those of the server 38.

For example, processor 80 also may compose one or more devices capable of processing electronic instructions, non-limiting examples including a microprocessor, a microcontroller or controller, an application specific integrated circuit (ASIC), a field programmable logic array (FPGA), etc.— just to name a few. As will be apparent from the description which follows, mobile device 30 may be programmed to carry out at least a portion of the method described herein. For example, processor 80 can be configured to execute digitally stored instructions which may be stored in memory 82 which include, among other things: receiving a request from a user (of the mobile device 30) to receive a secondary-language audio track for an AV program; receiving the secondary-language audio track (e.g., by downloading and storing in memory 82); wirelessly receiving a playback-control cue at the mobile device 30 (e.g., from the STB 62 or from audio data within a primary-language audio track of the AV program); and in response to receiving the playback-control cue, outputting the secondary-language audio track so that it is synchronized with audio of the primary-language audio track.

Like memory 42, memory 82 may include any non-transitory computer usable or readable medium, which may include one or more storage devices or articles. Exemplary non-transitory computer usable storage devices include conventional computer system RAM (random access memory), ROM (read only memory), EPROM (erasable, programmable ROM), EEPROM (electrically erasable, programmable ROM), as well as any other volatile or non-volatile media. Non-volatile media include, for example, optical or magnetic disks and other persistent memory. Volatile media include dynamic random-access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read. As discussed above, memory 82 may store one or more computer program products which may be embodied as software, firmware, or the like, as well as one or more secondary-language audio tracks.

According to at least one example, the one or more wireless chipsets 84 may comprise a cellular chipset facilitating cellular communication over a wide-geographic region (e.g., via LTE, CDMA, GSM, or the like) and at least one short-range wireless communication (SRWC) chipset facilitating Wi-Fi, Wi-Fi Direct, Bluetooth, Bluetooth Low Energy (BLE), etc. communication. Thus, as described above, mobile device 30 may download or stream secondary-language audio tracks via a cellular connection, via a short-range wireless connection, and/or via a wired or other wireless connection (e.g., to any suitable computing device).

Audio-input circuit 86 may comprise one or more microphones 90, as well as any suitable arrangement of filtering circuits (not shown), amplifying circuits (not shown), and the like. Microphone(s) 90 may comprise any suitable microphone configuration—e.g., including omni-directional, uni-directional, and/or bi-directional microphones. According to at least one example, microphone(s) 90 may be tuned to receive soundwave data from STB 62 and/or from entertainment system 18 (e.g., within range of 10-24,000 Hz).

Audio-output circuit 88 may comprise one or more electroacoustic transducers 92, as well as any suitable arrangement of filtering circuits (not shown), amplifying circuits (not shown), and the like. In one example, transducer(s) 92 at least output audio data that comprises a secondary-language audio track. In another example, circuit 88 comprises, among other things, a pre-amplifier circuit (not shown), and thus, circuit 88 outputs audio data that comprises the secondary-language audio track to earphones 78 (e.g., earphones 78 having a wired or wireless connection to circuit 88). In either instance, mobile device 30—via circuit 88—may output audio data so that user 28 may hear a different language for the AV program than that provided via the entertainment system 18.

Interface 89 may comprise any suitable hardware control devices enabling user 28 to enter data into mobile device 30, as well as any suitable hardware display device(s) so that interactive operating systems, mobile device software applications, or the like may provide visual output to user 28. For example, interface 89 may comprise an interactive touch screen or display. In at least one implementation, interface 89 further includes at least a portion of circuit 86 and/or circuit 88—e.g., receiving audio inputs (e.g., including but not limited to human speech/voice commands) and/or providing audio data outputs.

Earphones 78 may be any suitable mobile device accessory which are configured to convert audio data (e.g., an electrical signal) from audio-output circuit 88 to an acoustic signal audible by user 28. Non-limiting examples include wired or wireless headphones, earbuds, or the like.

Figure 3:
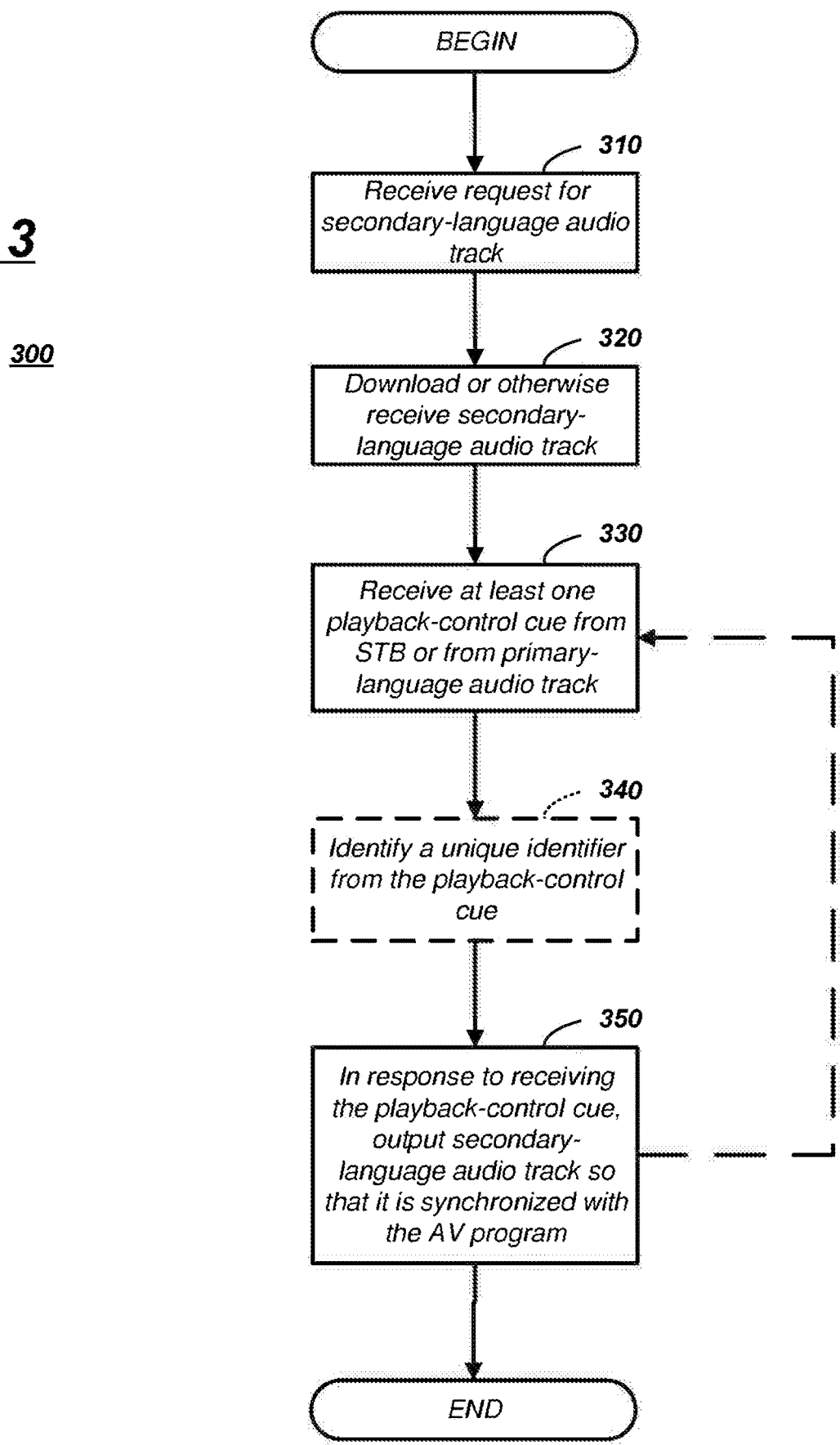
FIG. 3 is a flow diagram illustrating a process of providing the audio of the secondary-language audio track to the user who is viewing an audio-visual (AV) program that comprises a primary-language audio track.

Turning now to FIG. 3, a process 300 for providing a synchronized secondary-language audio track via mobile device 30 is illustrated. As explained above, terminal system 16 may receive an AV program from gateway 34 (via satellite(s) 32) and may deliver both visual and audio components to the users 26, 28 via the entertainment system 18. In the example that follows, for purposes of illustration only, user 26 desires to hear a primary-language audio track (e.g., in a first language—e.g., English) which is provided as the audio component of the AV program, and user 28 desires to hear a secondary-language audio track (e.g., in a second, different language—e.g., Spanish) via earphones 78 connected to his mobile device 30. As will be explained below, process 300 includes synchronizing the secondary-language audio track with the AV program—and more particularly, with the visual component of the AV program, with the primary-language audio track (i.e., the audio component thereof), or with both.

Process 300 begins with block 310. In block 310, mobile device 30 receives a request for a secondary-language audio track from user 28. According to one example, the request may be received via interface 89. For example, mobile device 30 may store (in memory 82) and execute (using processor 80) a software application that enables user 28 to listen to a secondary-language audio track while viewing the AV program. According to one example, this software application may permit mobile device 30 to communicate with satellite gateway 34—e.g., identifying what AV programs are available, what language tracks are available, what AV program is being viewed by users 26, 28, etc. In other examples, similar information may be obtained by communication between mobile device 30 and STB 62. Thus, using interface 89 and such a software application, user 28 may select a 'Spanish' audio track for the AV program being received via terminal 16 (or to be received in the future), and in response to the user input, processor 80 may interpret the input as an instruction to obtain a secondary-language audio track for the particular AV program.

Block 320, which follows block 310, may comprise processor 80 downloading or otherwise obtaining an audio data file that includes the requested secondary-language audio track. For example, the secondary-language audio track may be received wirelessly via chipset 84 (from wireless communication system 52, modem 54, or the like). And processor 80 may store the secondary-language audio track in memory 82. (Although not illustrated in FIG. 3, if a secondary audio track is not available, e.g., because a secondary-language audio track does not exist, then the process 300 may simply revert to playback of the primary audio track.)

In block 330 which follows, the AV program may begin playback, and mobile device 30 may receive at least one playback-control cue from STB 62. In at least some examples, user 26 or 28 provides a playback-control instruction to the STB 62, to the entertainment system 18, or both—e.g., to cue playback (e.g., pause, stop, rewind, fast-forward, skip scenes or chapters, etc.). In response to such a playback-control instruction, e.g., STB 62 may transmit wirelessly, e.g., by radio frequency signals, infrared communications, etc., an instruction to mobile device 30 so that processor 80 may synchronize the downloaded secondary-language audio track with the primary language audio track, may synchronize the secondary-language audio track with the visual component of the AV program, or both. The wireless instruction may be received by mobile device 30 via any suitable short-range wireless signal (received via chipset 84), via a light emission (e.g., received by a mobile device camera (not shown)), or via audio-input circuit 86—just to name a few examples.

In at least one example, the at least one playback-control cue comprises one of: a fast-forward cue, a rewind cue, a slow-motion cue, a single-frame advance cue, a single-frame rewind cue, a resume-play cue, or a skip cue. And the processor 80 of the mobile device 30 may use this playback-control cue to synchronize the playback of secondary-language audio track with that of AV program presented to the users 26, 28 by entertainment system 18 (block 350).

To illustrate one non-limiting example regarding how the playback-control cue is used, the cue may be a wireless transmission that includes an identifier that corresponds with a frame of the AV program (e.g., optional block 340). For instance, one example of the AV program may include a program that comprises a total of 14,000 frames of digital audio; as used herein, a frame of digital audio is a data segment that comprises audio information, wherein consecutive frames of digital audio played in sequence form an audio track that form at least a portion of the audio component of the AV program.

Figure 4:
FIGS. 4-7 illustrate examples of soundwave data which may be received by a mobile device and which may cue the mobile device to parse or change playback locations within the secondary-language audio track.
Figure 5:
Figure 6:
Figure 7:
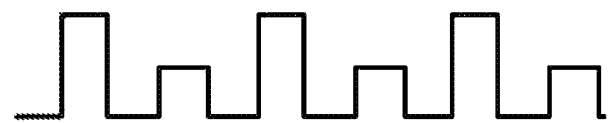

According to one example, each frame of digital audio may comprise a sequentially-numbered identifier (e.g., 0-14, 000). FIGS. 4-7 illustrate non-limiting examples of wireless signals that can be used to transmit the identifier. FIG. 4 illustrates a sine wave. FIG. 5 illustrates a square wave. FIG. 6 illustrates a square wave having a different duty cycle. And FIG. 7 illustrates a square wave having different amplitudes. Accordingly, STB 62 may transmit a playback-control cue by modulating (or otherwise altering) a sine wave, a square wave, or any suitable other waveform. For example, STB 62 may modulate the frequency of a waveform, the amplitude of a waveform, the duty cycle of a waveform, or the like in order to represent a unique identifier (e.g. identifiers 0-14, 000 or the like).

According to one non-limiting example, the wirelessly transmitted playback-control cue comprises soundwave data (i.e., it is transmitted acoustically)—e.g., from the electroacoustic transducer 74 of STB 62. In at least one example, the soundwave data comprises frequencies greater than 18,000 Hertz (Hz)—e.g., outside the range of most human-hearing capability. In this manner, the soundwave data may be undetectable by users 26, 28.

The soundwave data may comprise white noise, one or more tones, one or more pulses, or a combination thereof. As used herein, white noise is a plurality of different (and random) frequencies, each frequency being within a threshold value of the intensities of the other white noise frequencies. Accordingly, STB 62 may use white noise to communicate a playback-control cue to mobile device 30 by modulating the amplitude of the white noise (e.g., changing the gain, wherein different changes (or sequences of changes) represent different identifiers). As used herein, a tone comprises a single frequency or predetermined plurality of concurrently-emitted frequencies (e.g., such as a chord). Accordingly, STB 62 may use one or more tones to communicate a playback-control cue to mobile device 30 by modulating the frequency and/or amplitude thereof (e.g., wherein different tones represent different identifiers, wherein different frequencies and/or amplitudes of any respective tone represent a different identifier, or a combination thereof are used). And as used herein, a pulse comprises a repetitious wireless transmission repeated at a predetermined frequency for a predetermined interval; according to one example, a pulse comprises a repetition of tones repeated at a predetermined frequency over a predetermined interval. Accordingly, STB 62 may use one or more pulses to communicate a playback-control cue to mobile device 30 by using pulses having different tones, by using pulses having different predetermined frequencies, by using pulses having different amplitudes, by using pulses having different predetermined intervals, or the like—e.g., to represent different identifiers. Of course, any combination of techniques using white noise, tones, or pulses may be used to represent a set of identifiers.

Thus, if STB 62 sends a playback-control cue in the form of an acoustic transmission, mobile device 30 may receive it via audio-input circuit 86. For purposes of illustration only, consider the AV program to be playing back and being currently at frame '3000' when mobile device 30 receives a playback-control cue (from STB 62) that includes an identifier of '3300' (e.g., a skip cue to move forward in the AV program). Upon receipt, processor 80 may cue the playback of the secondary-language audio track forward to frame '3300,' and control the audio-output circuit 88 so that it initiates playing the secondary-language audio track (in Spanish) at frame '3300.' (E.g., block 350).

If, e.g., STB 62 sends another playback-control cue (acoustically) having identifier '2500,' then STB 62 is indicating to mobile device 30 that the AV program is skip cueing backwards. Thus, mobile device 30 similarly may receive the playback-control cue and correspondingly begin playing the secondary-language audio track at frame '2500.'

In other examples, STB 62 may send playback-control cues (acoustically or otherwise, e.g., via infrared) that represent fast-forward cues, rewind cues, slow-motion cues, single-frame advance cues, single-frame rewind cues, resume-play cues, and the like. Non-limiting examples of fast-forward cues include a predetermined-speed-fast-forward cue and a variable-speed-fast-forward cue. Non-limiting examples of rewind cues include a predetermined-speed-rewind cue and a variable-speed-rewind cue. Furthermore, non-limiting examples of skip cues include a skip-to-the-beginning cue, a skip-to-the-closing-credits cue, a skip-to-the-previous-chapter cue, a skip-to-the-next-chapter cue, a skip-forward-a-predetermined-number-of-seconds cue, and a skip-backward-a-predetermined-number-of-seconds cue. These are all merely examples and do not represent an exhaustive list; thus, still other playback-control cues may exist.

During some cues, the secondary-language audio track may be inaudible or incomprehensible. For example, during some fast-forward or rewind cues, it may be desirable for mobile device 30 to provide no sound via audio-output circuit 88 until the AV program begins normal playback again (i.e., until the AV program is playing at normal speed).

According to at least one example, within a predetermined interval, STB 62 may transmit to mobile device 30 a second playback-control cue that is redundant of (e.g., identical to) a first playback-control cue (e.g., received immediately prior thereto). In this manner, processor 80 may compare the first and second playback-control cues (and determine they match) before executing a playback change with respect to the secondary-language audio track playback. For example, continuing with one of the examples above, processor 80 may receive '3300' twice before skip cueing forward from frame '3000' to frame '3300.'

In some examples, STB 62 may transmit other data as well as part of the playback-control cue. For example, when mobile device 30 transmits wirelessly an acknowledgement of the playback-control cue, the STB 62 may determine and calculate a synchronicity-correction parameter—e.g., based on mobile device response time, propagation delay, computational latency, and the like. This parameter may be provided in a playback-control cue to mobile device 30, and processor 80 may calculate an offset for playing back the secondary-language audio track. Again, continuing with the example, above, if STB 62 determines that the synchronicity-correction parameter has a value of +10 frames (e.g., based on distance between the STB 62 and mobile device 30, latency at the mobile device processor 80, etc.), then when the STB 62 cues the mobile device 30 to frame '3300,' the processor 80 of the mobile device may cue to the instructed frame (e.g., '3300') and add 10 frames—e.g., beginning playback at frame '3310' to more accurately synchronize the secondary-language audio track with the AV program. This is merely one example of a correction parameter; other such parameters may be used (and may be included in at least some of the playback-control cues).

Returning to block 330 (FIG. 3), process 300 also may include audio-input circuit 86 receiving the primary-language audio track and extracting the playback-control cues therefrom—e.g., instead of receiving the playback-control cues from STB 62. According to one example, the playback-control cues may be embedded within the primary-language audio track itself (e.g., at computer server 38). For example, playback-control cues within the primary-language audio track also may comprise soundwave data, and in at least one example, the playback-control cues may be identifiers comprising white noise, one or more tones, one or more pulses, or any combination thereof (e.g., similar to the description above). Accordingly, the playback-control cues—whether implemented as identifiers or something else—may be received at mobile device from the STB 62 or the primary-language audio track itself.

Thus, in one example, the primary-language audio track may have embedded identifiers (e.g., carried within the audio component sent from the gateway 34). In at least one example, these identifiers may be identical or similar to those discussed above; therefore, they will not be described in detail here.

Of course, in other examples, other identifiers also could be used. For example, a set of unique identifiers may be stored in a look-up table of memory 82. Thus, upon receipt of a playback-control cue via microphone 90 of audio-input circuit 86, processor 80 may: extract or otherwise determine the unique identifier; using the look-up table to determine a unique playback-control instruction (e.g., such as fast-forward a predetermined amount, rewind a predetermined amount, etc.); and then execute the playback-control instruction.

Further, still other techniques exist for acoustically providing playback-control cues to mobile device 30 (e.g., from STB 62 and/or the primary-language audio track).

Following block 350, process 300 may end. Or in at least one example, process 300 may loop back to block 330 and repeat block 330, optional block 340, and/or block 350.

The subject matter set forth herein enable users of a set top box and an entertainment system to receive, via a mobile device, a secondary-language audio track for an audio-visual (AV) program, wherein the secondary-language audio track corresponds with a primary-language audio track (e.g., which is played via the entertainment system). Based on playback-control cues from the set top box or from a primary-language audio track, the mobile device may synchronize the playback of the secondary-language audio track (via the mobile device) even when the user rewinds, fast-forwards, or otherwise changes a normal playback of the AV program.

In general, the computing systems and/or devices described may employ any of a number of computer operating systems, including, but by no means limited to, versions and/or varieties of the Microsoft® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, or the Android operating system developed by Google, Inc. and the Open Handset Alliance. Examples of computing devices include, without limitation, a computer server, a computer workstation, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Nonvolatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed:

1. An electronic device comprising:
   at least one input component configured to receive audio data;
   at least one output component configured to output audio data;
   one or more processors; and
   memory communicatively coupled with and readable by the one or more processors and having stored therein processor-readable instructions, which, when executed by the one or more processors, cause the one or more processors to perform operations comprising:
      detecting a signal to output a second audio track that corresponds with a first audio track of an audio-visual program output by a set of one or more devices configured to output audio-visual data, where the set of one or more devices is separate from the electronic device;
      processing the second audio track received via one or more networks from a remote system;
      communicating with the set of one or more devices outputting the audio-visual data;
      consequent to the communicating, synchronizing output of audio data of the second audio track with a playback-control operation that adjusts output corresponding to the audio-visual program based at least in part on:
         detecting an indication of a playback-control cue output by the set of one or more devices to adjust output corresponding to the audio-visual program, and determining that the playback-control cue defines a particular playback control operation from a plurality of playback control operations, wherein the playback-control cue comprises soundwave data having characteristics that differentiate the particular playback control operation from other operations of the plurality of playback control operations;
         calculating a playback offset for the second audio track to synchronize the second audio track with the first audio track, the playback offset based at least in part on the communicating; and
         based at least in part on the playback offset and in response to receiving the indication of the playback-control cue, outputting the audio data of the second audio track so that the audio data is synchronized with the first audio track.

2. The electronic device as recited in claim 1, where the set of one or more devices comprises a display device and one or more speaker devices.

3. The electronic device as recited in claim 1, where the set of one or more devices further comprises a set-top box.

4. The electronic device as recited in claim 1, where the playback-control cue comprises a fast-forward cue, a rewind cue, a slow-motion cue, a single-frame advance cue, a single-frame rewind cue, a resume-play cue, or a skip cue.

5. The electronic device as recited in claim 4, where the detecting the indication of the playback-control cue to adjust output corresponding to the audio-visual program comprises detecting an acoustic indication of the playback-control cue.

6. The electronic device as recited in claim 1, where the playback offset is based at least in part on one or more of a response time of the electronic device, a propagation delay, and/or a computational latency.

7. The electronic device as recited in claim 1, where the electronic device is configured to provide a digital assistant.

8. A method comprising:
   detecting, by a first device, a signal to output a second audio track that corresponds with a first audio track of an audio-visual program output by a set of one or more devices configured to output audio-visual data, where:
      the first device is separate from the set of one or more devices, and
      the first device is configured to output audio data;
   receiving the second audio track at the first device via one or more networks from a remote system;
   communicating with the set of one or more devices outputting the audio-visual data;
   consequent to the communicating, synchronizing, by the first device, output of audio data of the second audio track with a playback-control operation that adjusts output corresponding to the audio-visual program based at least in part on:
- detecting an indication of a playback-control cue output by the set of one or more devices to adjust output corresponding to the audio-visual program, and determining that the playback-control cue defines a particular playback control operation from a plurality of playback control operations, wherein the playback-control cue comprises soundwave data having characteristics that differentiate the particular playback control operation from other operations of the plurality of playback control operations;
- calculating a playback offset for the second audio track to synchronize the second audio track with the first audio track, the playback offset based at least in part on the communicating; and
- based at least in part on the playback offset and in response to receiving the indication of the playback-control cue, outputting the audio data of the second audio track so that the audio data is synchronized with the first audio track.

9. The method as recited in claim 8, where the set of one or more devices comprises a display device and one or more speaker devices.

10. The method as recited in claim 8, where the set of one or more devices further comprises a set-top box.

11. The method as recited in claim 8, where the playback-control cue comprises a fast-forward cue, a rewind cue, a slow-motion cue, a single-frame advance cue, a single-frame rewind cue, a resume-play cue, or a skip cue.

12. The method as recited in claim 11, where the detecting the indication of the playback-control cue to adjust output corresponding to the audio-visual program comprises detecting an acoustic indication of the playback-control cue.

13. The method as recited in claim 8, where the playback offset is based at least in part on one or more of a response time of the first device, a propagation delay, and/or a computational latency.

14. The method as recited in claim 8, where the first device is configured to provide a digital assistant.

15. A non-transitory, processor-readable medium comprising instructions which, when executed by one or more processing devices, cause the one or more processing devices to perform operations comprising:
- detecting a signal to output a second audio track that corresponds with a first audio track of an audio-visual program output by a set of one or more devices configured to output audio-visual data, where the set of one or more devices is separate from the one or more processing devices;
- processing the second audio track received via one or more networks from a remote system;
- communicating with the set of one or more devices outputting the audio-visual data;
- consequent to the communicating, synchronizing output of audio data of the second audio track with a playback-control operation that adjusts output corresponding to the audio-visual program based at least in part on:
  - detecting an indication of a playback-control cue output by the set of one or more devices to adjust output corresponding to the audio-visual program, and determining that the playback-control cue defines a particular playback control operation from a plurality of playback control operations, wherein the playback-control cue comprises soundwave data having characteristics that differentiate the particular playback control operation from other operations of the plurality of playback control operations;
  - calculating a playback offset for the second audio track to synchronize the second audio track with the first audio track, the playback offset based at least in part on the communicating; and
  - based at least in part on the playback offset and in response to receiving the indication of the playback-control cue, outputting the audio data of the second audio track so that the audio data is synchronized with the first audio track.

16. The non-transitory, processor-readable medium as recited in claim 15, where the set of one or more devices comprises a display device and one or more speaker devices.

17. The non-transitory, processor-readable medium as recited in claim 15, where the set of one or more devices further comprises a set-top box.

18. The non-transitory, processor-readable medium as recited in claim 15, where the playback-control cue comprises a fast-forward cue, a rewind cue, a slow-motion cue, a single-frame advance cue, a single-frame rewind cue, a resume-play cue, or a skip cue.

19. The non-transitory, processor-readable medium as recited in claim 18, where the detecting the indication of the playback-control cue to adjust output corresponding to the audio-visual program comprises detecting an acoustic indication of the playback-control cue.

20. The non-transitory, processor-readable medium as recited in claim 15, where the playback offset is based at least in part on one or more of a response time of the one or more processing device, a propagation delay, and/or a computational latency.

* * * * *